United States Patent [19]

Miller

[11] 4,394,910
[45] Jul. 26, 1983

[54] SHELF FOR ORDER PICKING SYSTEMS

[75] Inventor: Daniel A. Miller, Lebanon, Ohio

[73] Assignee: Nestier Corporation, Columbus, Ohio

[21] Appl. No.: 189,195

[22] Filed: Sep. 22, 1980

[51] Int. Cl.$^3$ .............................................. A47F 5/00
[52] U.S. Cl. .................................. 211/490; 211/151; 211/134
[58] Field of Search ............... 211/134, 187, 490, 151, 211/186, 182, 153, 183

[56] References Cited

U.S. PATENT DOCUMENTS

| | | | |
|---|---|---|---|
| 1,563,116 | 11/1925 | Tinsley | 211/151 |
| 2,786,578 | 3/1957 | DeGaaf et al. | 211/151 X |
| 3,900,112 | 8/1975 | Azzi et al. | 211/151 X |
| 4,168,780 | 9/1979 | Parrott | 211/151 |

FOREIGN PATENT DOCUMENTS 670336  9/1963  Canada ................................ 211/490

*Primary Examiner*—Francis K. Zugel
*Assistant Examiner*—Robert W. Gibson, Jr.
*Attorney, Agent, or Firm*—Thomas E. Beall, Jr.

[57] ABSTRACT

A shelf for an order picking system includes a rectangular frame having front and rear rails with upwardly facing bottom support surfaces and uniformly spaced notches along the length thereof above the support surfaces. Track members extending across the frame between the rails have bottom end portions supported on the support surfaces and have end edge portions received in certain of the notches. The track members are selectively adjustable to different positions by placing the track member end edges in different notches.

22 Claims, 7 Drawing Figures

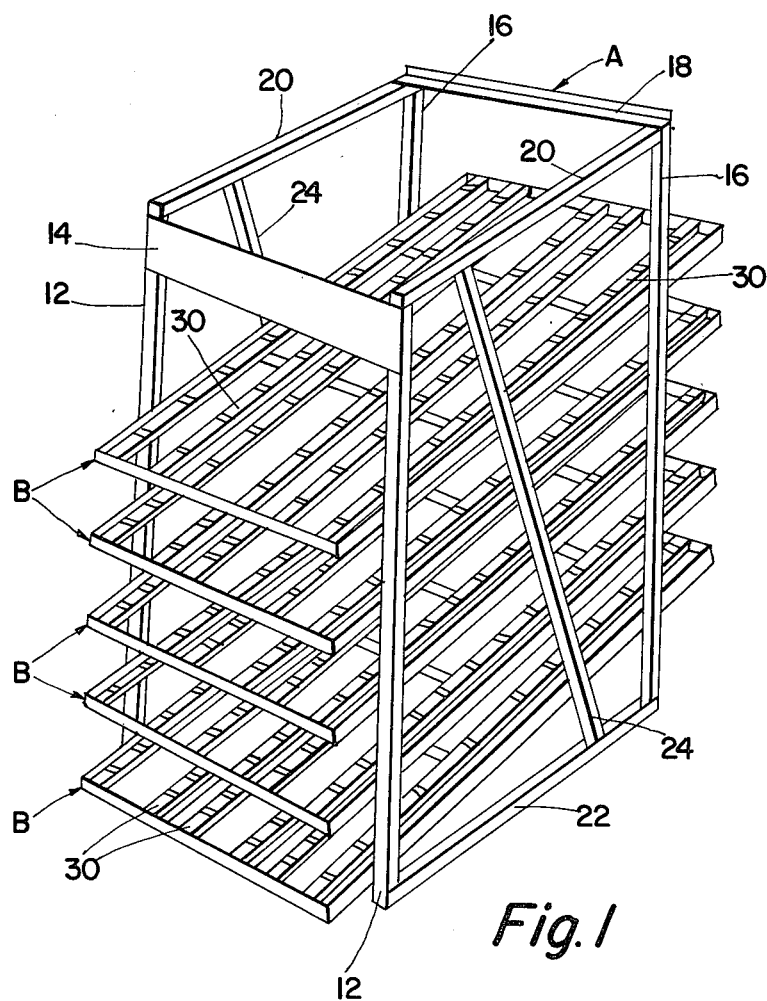
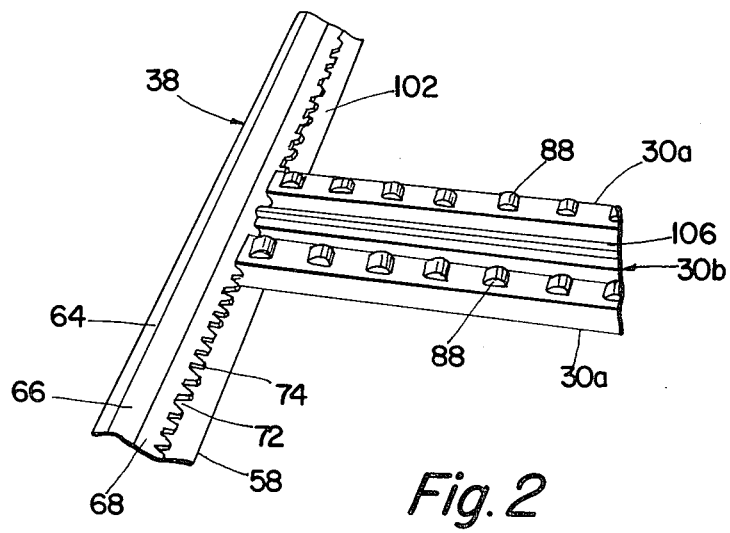
Fig. 1
Fig. 2

SHELF FOR ORDER PICKING SYSTEMS

BACKGROUND OF THE INVENTION

This application relates to the art of order picking systems and, more particularly, to gravity flow racks in which merchandise cartons are placed at the rear of downwardly inclined shelves for sliding movement of the cartons toward the front of the shelves.

Gravity flow racks for order picking systems include upright frame members supporting downwardly inclined shelves along which merchandise cartons slide from the back toward the front of the rack. The shelves are rectangular frames having roller track members and guide track members extending between front and rear shelf frame rails. It is desirable to adjust the roller track members and guide track members from side-to-side of the shelf frame in order to accommodate merchandise cartons of different widths. Existing arrangements for adjusting the roller track members and guide track members are expensive to manufacture and difficult to operate.

SUMMARY OF THE INVENTION

A shelf for a gravity flow rack in an order picking system includes a generally rectangular frame defined by opposite side frame members, and front and rear rails. The rails have upwardly facing bottom support surfaces inside of the frame, and have a plurality of uniformly spaced notches along the length thereof above the support surfaces and opening inwardly of the frame. Track members extend across the frame between the rails and have a width substantially less than the width of the frame between the side frame members. The track members have bottom end portions supported on the support surfaces and have end edge portions received in certain of the notches. The track members are selectively adjustable across the frame in a direction between the side frame members by lifting same upwardly of the frame for transverse shifting and then lowering to a new position. The notches retain the track members in their adjusted position.

In a preferred arrangement, the rail bottom support surfaces are on bottom flanges having bottom flange edges inside of the frame. The notches are defined on an upper rail flange spaced above the bottom flange. The upper rail flange has spaced-apart teeth between which the notches are defined. The teeth have outer terminal teeth ends spaced in a direction outwardly of the frame from the bottom flange edges.

The notches are preferably generally V-shaped so they decrease in width from their entrance openings to their bases.

The improved rail for the self frame has a cross-sectional shape including a bottom flange having a bottom flange terminal edge and an opposite bottom flange edge. A rail upper portion extends upwardly from the opposite bottom flange edge and in a direction back toward the bottom flange terminal edge. The rail upper portion terminates in an upper edge spaced above the bottom flange adjacent the bottom flange terminal edge. A plurality of uniformly spaced notches are provided along the upper edge. The upper edge is preferably spaced from the bottom flange terminal edge in a direction toward the opposite bottom flange edge. The upper portion of the rail preferably includes an inclined portion extending upwardly from the bottom flange opposite edge and in a direction toward the bottom flange terminal edge. A generally straight portion extends from the inclined portion generally parallel to the bottom flange. A downwardly extending portion extends downwardly from the straight portion. Finally, a terminal portion extends from the downwardly extending portion generally parallel to the bottom flange in a direction toward the bottom flange terminal edge. This terminal portion defines an upper flange spaced above the bottom flange and extending generally parallel thereto. The notches are provided in the upper flange.

It is a principal object of the present invention to provide an improved shelf for a gravity flow rack in an order picking system.

It is a further object of the invention to provide such a shelf having an improved arrangement for adjustment of track members thereon.

It is an additional object of the invention to provide an improved rail member for use in a shelf frame of a gravity flow rack.

BRIEF DESCRIPTION OF THE DRAWING

FIG. 1 is a diagrammatic perspective illustration of a gravity flow rack;

FIG. 2 is a partial perspective illustration of a portion of a rail supporting end portions of roller track members and a guide track member;

DESCRIPTION OF A PREFERRED EMBODIMENT

Figure 3:
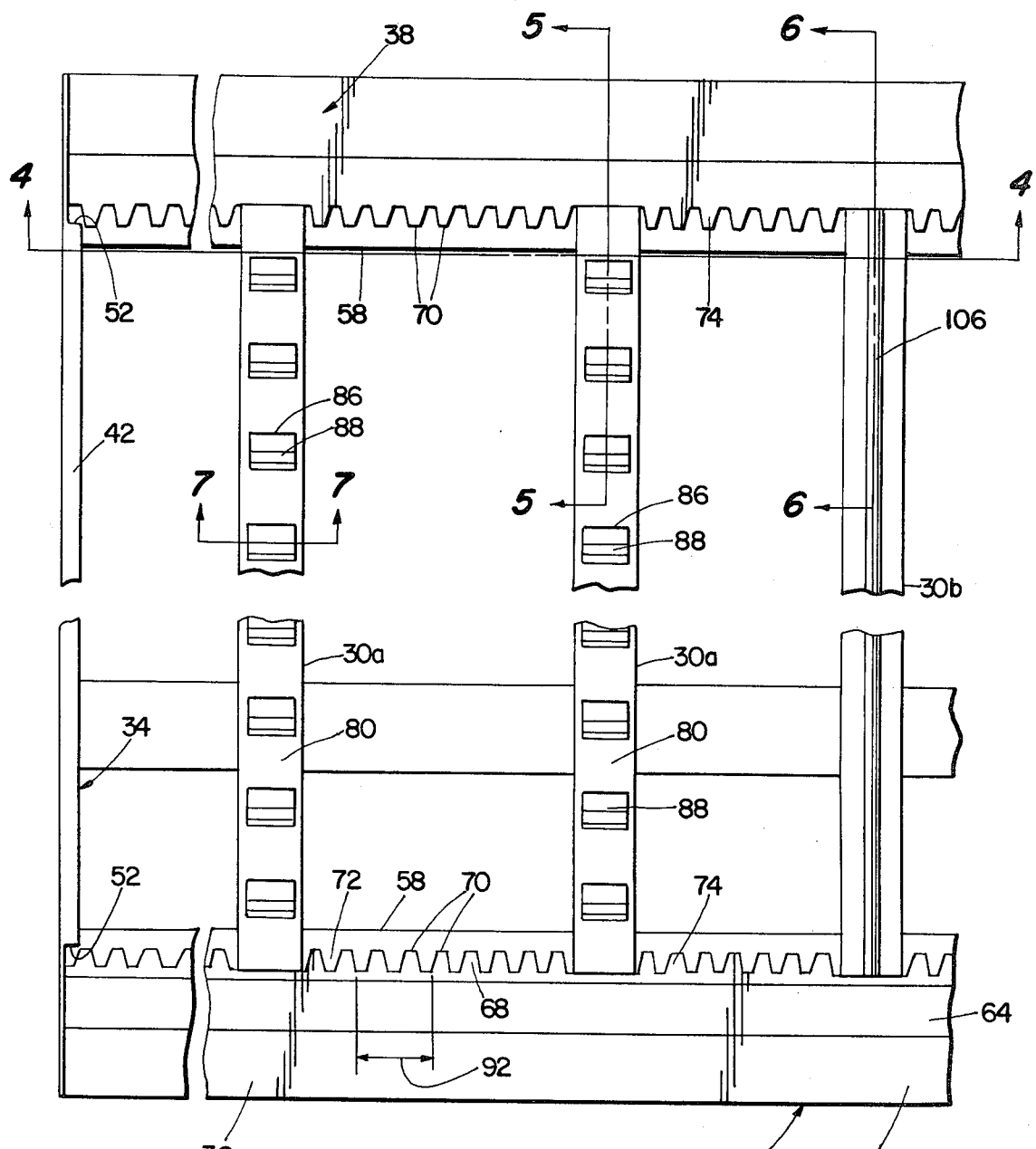
FIG. 3 is a partial top plan view of a shelf constructed in accordance with the present application.

FIG. 1 shows a gravity flow rack including a generally cubical frame having spaced upright front columns 12 connected by an upper front connecting member 14, and spaced upright rear columns 16 connected by an upper rear connecting member 18. Front and rear columns 12, 16 are connected adjacent their upper and lower ends by upper and lower side connecting members 20, 22. Diagonal brace members 24 are connected between upper and lower side connecting members 20, 22. A plurality of vertically-spaced shelves B are supported on columns 12, 16 of cubical frame A, with the shelves being downwardly inclined in a direction from rear columns 16 toward front columns 12. Each shelf B is in the form of a generally rectangular frame having a plurality of track members 30 extending from front to rear thereof. Cartons or boxes containing merchandise are positioned on track members 30 of shelves B adjacent rear columns 16, and the boxes or cartons slide along the track members to the front of shelves B adjacent front columns 12. A person making up a merchandise order may then select articles of merchandise from the boxes at the front of the rack.

Figure 4:
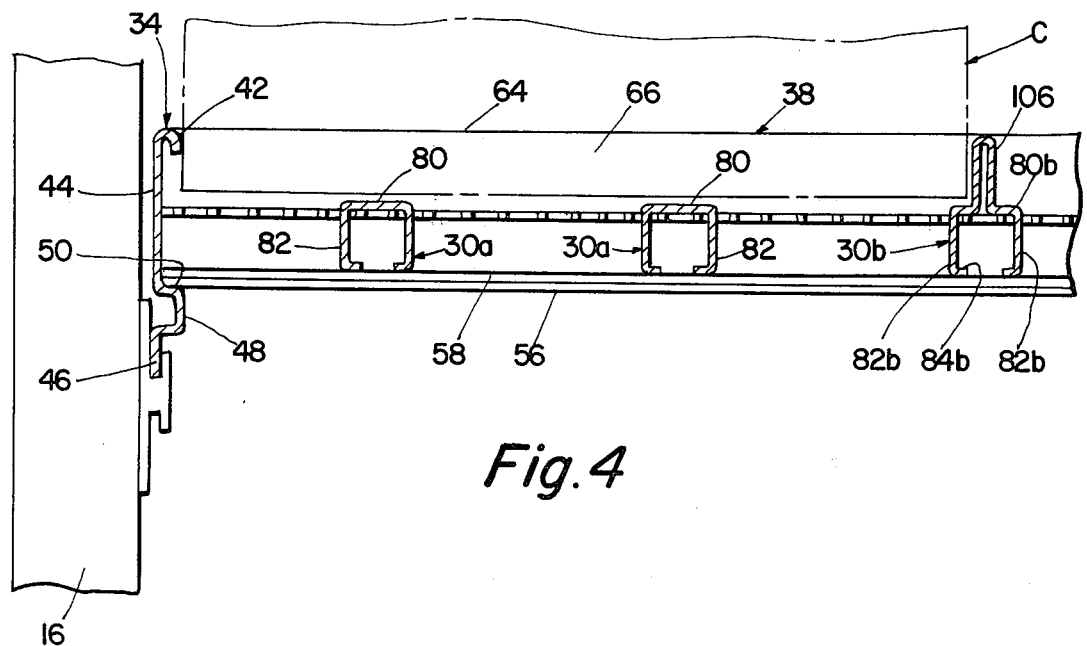
FIG. 4 is a partial cross-sectional elevational view taken generally on line 4—4 of FIG. 3.

With reference to FIG. 3, shelf B includes a generally rectangular frame defined by spaced-apart parallel opposite side frame members 34, only one of which is shown in FIG. 3, and spaced-apart parallel front and rear rails 36, 38 of identical construction. Rails 36, 38 are welded between side frame members 34. As shown in FIGS. 3 and 4, each side frame member 34 has an inwardly and downwardly extending smoothly curved portion 42 along the upper edge thereof providing one guide surface for a merchandise carton C. Each side frame member 34 has an upper main web portion 44, and a lower web portion 46 in alignment therewith and spaced therefrom by a reversely curved portion 48 which extends inwardly from the bottom edge of upper main web portion 44, then downwardly, and then back outwardly to the upper edge of lower web portion 46. Reversely curved portion 48 provides an upwardly facing shoulder 50. Inwardly curved portions 42 are cut-away adjacent the opposite ends of side frame members 34 so that opposite ends 52 of each curved portion 42 are spaced from rails 36, 38.

Figure 5:
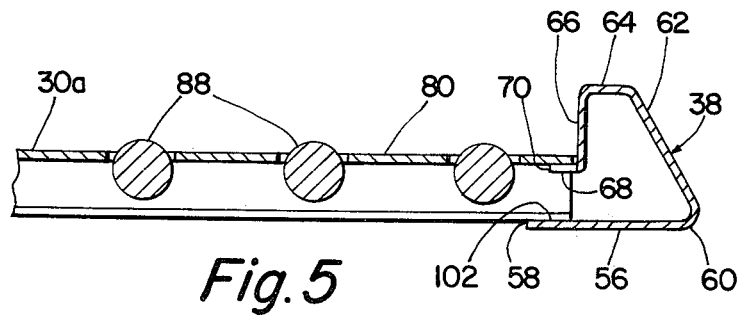
FIG. 5 is a partial cross-sectional elevational view taken generally on line 5—5 of FIG. 3.
Figure 6:
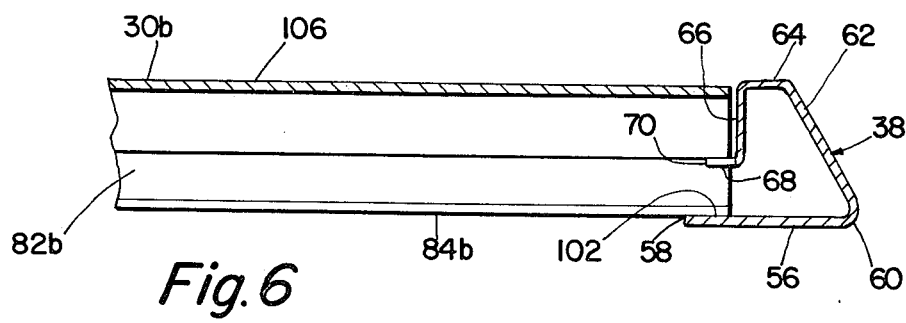
FIG. 6 is a partial cross-sectional elevational view taken generally on line 6—6 of FIG. 3.

FIGS. 5 and 6 show the cross-sectional shape of rail 38 and it will be recognized that the cross-sectional shape of rail 36 is the same. Rail 38 includes a bottom flange 56 having a free terminal edge 58 and an opposite edge generally indicated at 60. A rail upper portion extends upwardly from edge 60 and back toward free terminal edge 58. This upper rail portion includes an inclined portion 62 extending upwardly from bottom flange opposite edge 60 and in a direction back toward bottom flange free terminal edge 58. The upper edge of inclined portion 62 merges into a generally straight horizontal portion 64 extending generally parallel to bottom flange 56. Straight portion 64 merges into a generally vertical downwardly extending portion 66. Downwardly extending portion 66 merges into a terminal flange portion extending from the bottom edge of downwardly extending portion 66 back toward bottom flange terminal edge 58 and generally parallel to bottom flange 56. Terminal flange portion 68 is spaced above bottom flange 56 and the free edge 70 of terminal flange portion 68 is spaced from bottom flange free terminal edge 58 in a direction toward opposite bottom flange edge 60.

As best shown in FIG. 3, terminal flange portion 68 has uniformly spaced notches 72 along the length thereof defined between teeth 74. The sides of teeth 74 and notches 72 are tapered such that notches 72 are substantially wider where they open outwardly as compared to the width of the bottoms thereof. The terminal ends 70 of teeth 74 coincide with the upper free edge 70 of terminal flange portion 68 and are spaced from bottom flange free terminal edge 58 as clearly shown in FIG. 3.

Rails 36, 38 are positioned between end portions of side frame members 34 with bottom flanges 56 on rails 36, 38 resting on shoulders 50 of side frame members 34 as shown in FIG. 4. With bottom flanges 56 resting on shoulders 50, upper straight portion 64 of rails 36, 38 is approximately even with the upper edges of side frame members 34. Rails 36, 38 are welded in position to side frame members 34.

The track members 30 of FIG. 1 are of two different types as shown at 30a and 30b in FIGS. 3-6. Roller track member 30a has a generally inverted U-shaped cross-sectional configuration including a straight top web 80 and opposite legs 82 extending downwardly perpendicular thereto. Legs 82 have inwardly turned leg end portions 84 opposite from web 80. A plurality of longitudinally-spaced rectangular openings 86 are provided in web 80. Rollers 88 are suitably rotatably mounted to legs 82 and project upwardly through openings 86 so that the rollers 88 extend above the upwardly facing surface of web 80.

Figure 7:
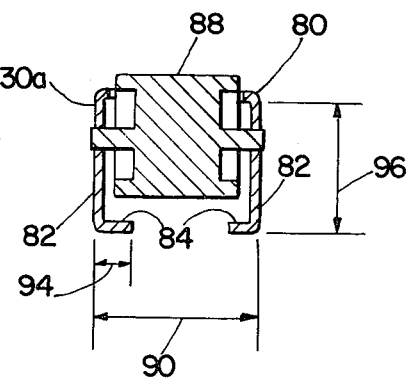
FIG. 7 is a cross-sectional elevational view taken generally on line 7—7 of FIG. 3.

The external width of a roller track member 30a between the outwardly facing outer surfaces of legs 82 is generally indicated by dimension 90 in FIG. 7. This dimension is preferably approximately equal to the dimension 92 in FIG. 3 which includes the width of three notch bottoms plus two teeth. The dimension 94 in FIG. 7 from the external surface of a leg 82 to the terminal edge of an inwardly turned portion 84 is preferably slightly less than the width of a notch bottom. The vertical dimension 96 in FIG. 7 from the under surface of web 80 to the external surface of an inwardly turned portion 84 is preferably slightly greater than the distance from upwardly facing support surface 102 on rail flange 56 to the upwardly facing surface on terminal flange 68. The length of a roller track member 30a between its opposite ends is preferably slightly less than the distance between the bottoms of notches 72 on front and rear rails 36, 38. With the arrangement described, roller track members 30a are easily positionable with the leg end edges thereof received in notches 72. The bottom end portions of roller track members 30a are supported on upwardly facing support surfaces 102 of bottom flanges 56 on rails 36, 38.

Guide rack member 30b is shaped and dimensioned similarly to roller track member 30a and corresponding parts thereof are identified by the same numerals with a suffix "b" added. However, instead of having rectangular notches in its web 80b and rollers, guide track member 30b has a web 80b which includes a central longitudinally extending and upwardly projecting reversely curved guide projection 106. Guide track member 30b is positioned within a shelf between front and rear rails 36, 38 in the same manner as roller tracks 30a. The spacing and positioning of track members 30a, 30b is easily changed simply by lifting up on a track member and moving the same to a new location for lowering back onto support surface 102 and reception in notches 72. FIG. 4 shows a rectangular carton C slidably guided on a pair of roller track members 30a and with its opposite sides being guided by inwardly turned portion 42 on a side frame member 34, and by a guide projection 106 on guide track member 30b. Guide track members 30b can be positioned at desired spacings for accommodating cartons of different widths. Roller track members 30a can also be adjusted for properly centrally supporting the cartons.

Teeth 74 and notches 72 are of generally the same size and are of reverse trapezoidal shape in plan view. Thus, teeth 74 have outer teeth ends which are substantially narrower than the bases of the teeth. Likewise, the open outer ends of notches 72 are substantially wider than the bases of such notches.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. A shelf for an order picking system comprising:
a generally rectangular frame defined by opposite side frame members and front and rear rails, said rails having upwardly facing bottom support surfaces inside of said frame, each of said rails having a plurality of uniformly spaced notches above said support surfaces opening inwardly of said frame, track members extending across said frame between said rails and having a width substantially less than the width of said frame between said side frame members, said track members having bottom end portions supported on said support surfaces and having end edge portions received in certain of said notches, and said track members being selectively adjustable across said frame in a direction between said side frame members by lifting same upwardly of said frame for transverse shifting and then lowering to a new position; further including, said bottom support surfaces being on bottom flanges having bottom flange edges inside said frame, said notches being defined on an upper rail flange spaced above said bottom flange, said upper rail flange having spaced-apart teeth between which said notches are defined, and said teeth having teeth ends spaced in a direction outwardly of said frame from said bottom flange edges.

2. The shelf of claim 1 wherein said track members re generally U-shaped in cross-section to have opposite legs connected by a web, said track members being positioned with said webs facing upwardly, said bottom end portions of said track members which are supported in said support surfaces being defined by bottom end portions of said legs and said end edge portions of said rack members received in said notches being defined by end edge portions of said legs.

3. The shelf of claim 2 wherein said legs have inwardly turned leg end portions opposite from said webs.

4. The shelf of claim 2 wherein said legs of each said rack member are spaced-apart a distance greater than the spacing between two of said notches such that said legs cooperate to provide lateral stability for said track member and further substantially preventing said track member from moving in rotation with respect to the longitudinal axis of said track member.

5. The shelf of claim 1 wherein said notches have notch bottoms and said notches open outwardly at notch openings which are substantially wider than said notch bottoms.

6. A rail for an order picking shelf frame, said rail having a cross-sectional shape including a bottom flange having a bottom flange terminal edge and an opposite bottom flange edge, a rail upper portion extending upwardly from said opposite bottom flange edge and in a direction back toward said bottom flange terminal edge, said rail upper portion terminating in an upper edge spaced above said bottom flange adjacent said bottom flange terminal edge, and a plurality of uniformly spaced notches along said upper edge.

7. The rail of claim 6 wherein said upper edge is spaced from said bottom flange terminal edge in a direction toward said opposite bottom flange edge.

8. The rail of claim 6 wherein said upper portion includes an inclined portion extending upwardly from said bottom flange opposite edge and in a direction toward said bottom flange terminal edge, a generally straight portion extending from said inclined portion generally parallel to said bottom flange, a downwardly extending portion extending downwardly from said straight portion, and a terminal portion extending from said downwardly extending portion generally parallel to said bottom flange in a direction toward said bottom flange terminal edge, and said notches being in said terminal portion.

9. The rail of claim 8 wherein said notches are defined between teeth having teeth ends spaced from said bottom flange terminal edge in a direction toward said bottom flange opposite edge, and said teeth having teeth bases which are substantially wider than said teeth ends.

10. A shelf for an order picking system comprising: a generally rectangular frame defined by opposite side frame members and front and rear rails, said rails having an integral one-piece, homogeneous bent sheet metal construction of uniform thickness, track members extending across said frame between said rails and having a width substantially less than the width of said frame members between said side frame members, each of said rails having bottom support means for supporting said track members and each of said rails having a plurality of uniformly spaced apart teeth forming notches therebetween, said notches having notch bottoms, said teeth being spaced above said support means, said track members having a web portion extending between opposed downwardly extending leg portions, a spacing between said leg portions being equal in width to an integral multiple of the distance between said notch bottoms such that said leg portions may be received in said notches and supported by said support means and further, said track members having a length approximately equal to but slightly less than the perpendicular distance between opposed ones of said notch bottoms of said front and rear rails such that said leg portions may be guided through said notches onto said support means without movement of said track members occuring in a longitudinal direction with respect to said frame.

11. A shelf according to claim 10 wherein said bottom support means for supporting said track members includes an upwardly facing bottom support surface inside of said frame.

12. A shelf according to claim 10 wherein said track members have bottom end portions which are supported on said bottom support means.

13. A frame according to claims 1 or 10, wherein one of said track members is a guide track member having a cross-sectional shape which includes a central, longitudinally extending, upwardly projecting, reversely curved guide projection which extends above the top surface of said web portion for forming a guide wall which is generally parallel with said side frame members.

14. A shelf according to claim 10, 11, 16 or 17, wherein said track members are selectively adjustable across said frame in a direction between said frame members by lifting said track members generally upwardly in a perpendicular direction with respect to said frame, by transverse shifting of said frame members with respect to said frame, and by lowering said track members in a direction generally downwardly and perpendicular with respect to said frame.

15. A rail for an order picking shelf frame, said rail having a cross-sectional shape including an upper straight portion, an inclined portion merging with one end of said upper edge, a generally vertical downwardly extending portion merging with the opposite end of said straight portion, and a terminal flange portion integral with said vertical portion, extending outwardly from said cross-sectional shape and generally perpendicular to said downwardly extending portion, said terminal flange having a plurality of uniformally spaced apart teeth forming notches therebetween.

16. A shelf for an order picking system comprising:

a generally rectangular frame defined by opposite side frame members and front and rear rails, said rails having an integral, one-piece, homogeneous bent sheet metal construction of uniform thickness, each of said rails having an upper flange extending inwardly of said frame, said flange having a plurality of uniformally spaced apart teeth forming notches therebetween, said notches having notch bottoms, track members extending across said frame between said rails and having a width substantially less than the width of said frame between said side frame members, said track members being of an inverted U-shaped having a web portion extending between opposed downwardly extending leg portions, the spacing between said leg portions being equal in width to an integral multiple of the middle distance between said notch bottoms such that said leg portions are received in said notches, and further said track members having a length approximately equal to but slightly less than the perpendicular distance between opposed ones of said notch bottoms of said front and rear rails such that said leg portions may be guided through said notches without movement of said track members occuring in a longitudinal direction with respect to said frame, said track member web portion engaging the top surface of and being supported by said teeth.

17. A shelf according to claim 16 wherein each of said rails have bottom support means for supporting said track members, and said track members have bottom end portions which engage with and are supported by said bottom support means.

18. A shelf according to claim 10 or 16 wherein said legs have inwardly turned leg end portions terminating in a free end edge, said leg end portions having a maximum width from the external surface of said leg to said free edge which is less than the minimum width of any one of said notch bottoms.

19. A shelf according to claim 10 or 16 further including said teeth having teeth end portions extending inwardly of said frame, abutment means on each of said front and rear rails engageable with said track members for substantially preventing longitudinal movement of said track members when said track members are disposed within said frame, said track members further being defined as having a length greater than the distance between any one of said teeth ends of said front rail and said abutment means of said rear rail and further greater than the distance between any of said teeth ends of said rear rail and said abutment means of said front rail.

20. A shelf for an order picking system comprising:
a generally rectangular frame defined by opposite side frame members and front and rear rails, each of said rails having upwardly facing bottom support surfaces inside of said frame, each of said rails having a plurality of uniformly spaced apart teeth forming notches therebetween above said support surfaces with said notches opening inwardly of said frame, each of said bottom support surfaces being on bottom flanges having bottom flange edges inside said frame, said notches and said teeth being defined on an upper rail flange spaced above said bottom flange, said teeth having teeth ends spaced in a direction outwardly of said frame from said bottom flange edges, track members extending across said frame between said rails and having a width substantially less than the width of said frame between said side frame members, said track members supported on said support surfaces and having edge portions received in certain of said notches, and said track members being selectively adjustable across said frame in a direction between said side frame members by lifting same upwardly of said frame for transverse shifting and then lowering to a new position.

21. A shelf according to claim 1, 10, 11, 16, 17, or 20 wherein at least one of said track members is a roller track member having rollers mounted for rotation between said legs, said rollers projecting upwardly through openings in said web so that said rollers extend above the upwardly facing surface of said web, said rollers being spaced along the longitudinal direction of said web such that said roller track member provides for a continuous rolling surface for an object placed on the upper surface of said rollers.

22. A shelf according to claim 1 wherein each of said front and rear rails have abutment means engageable with said track members for substantially preventing said track members from moving in a longitudinal direction which is generally perpendicular to said front and rear rails when said track members are disposed within said frame, said track members having a length which is greater than the distance between any of said teeth ends of said front rail and said abutment means of said rear rail and further greater than the distance between any of said teeth ends of said rear rail and said abutment means of said front rail.

* * * * *